G. DETRICK.
CHART FOR TEACHING UNIVERSAL HISTORY.
APPLICATION FILED NOV. 1, 1920.
1,406,173.
Patented Feb. 14, 1922.
2 SHEETS—SHEET 1.
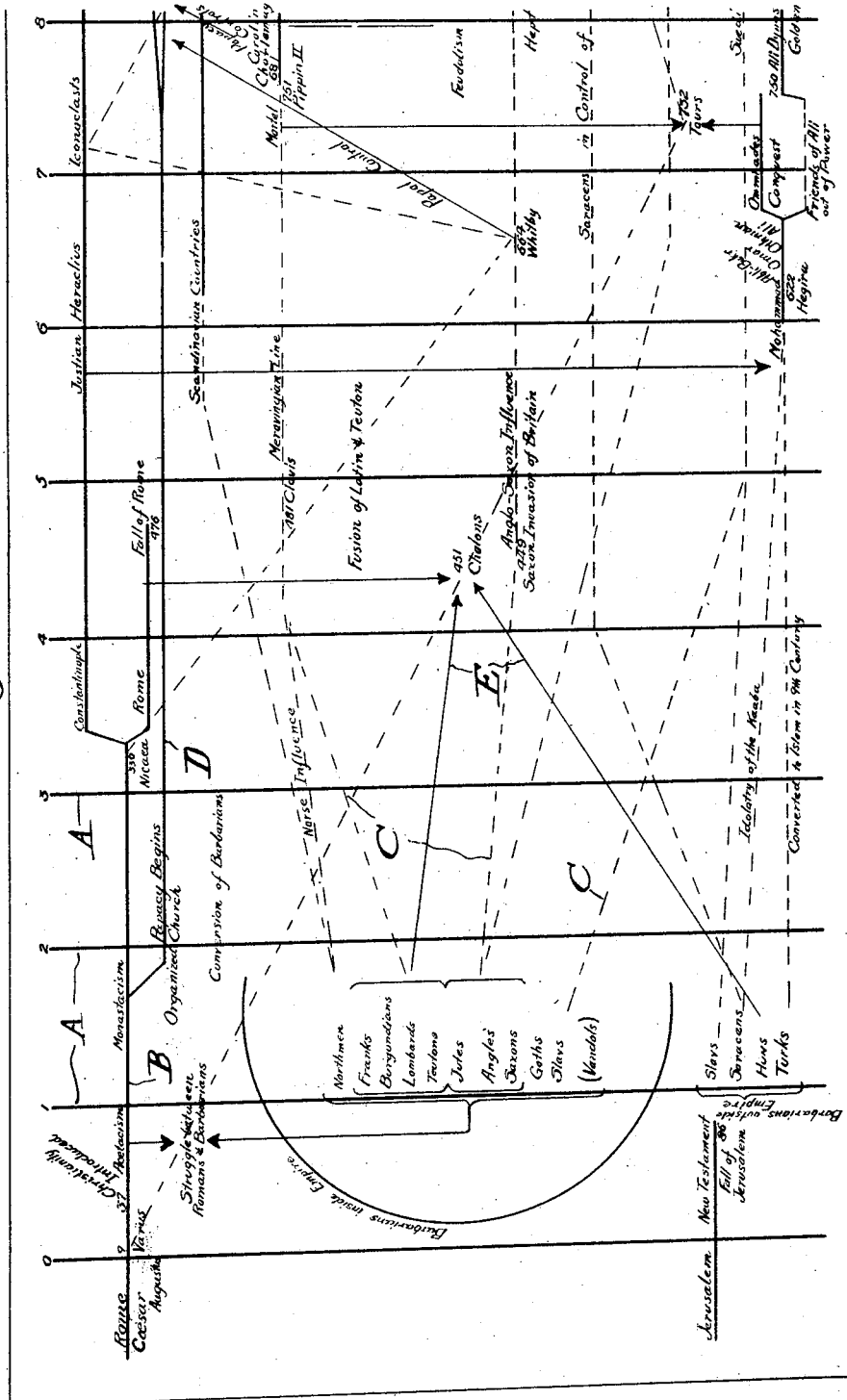

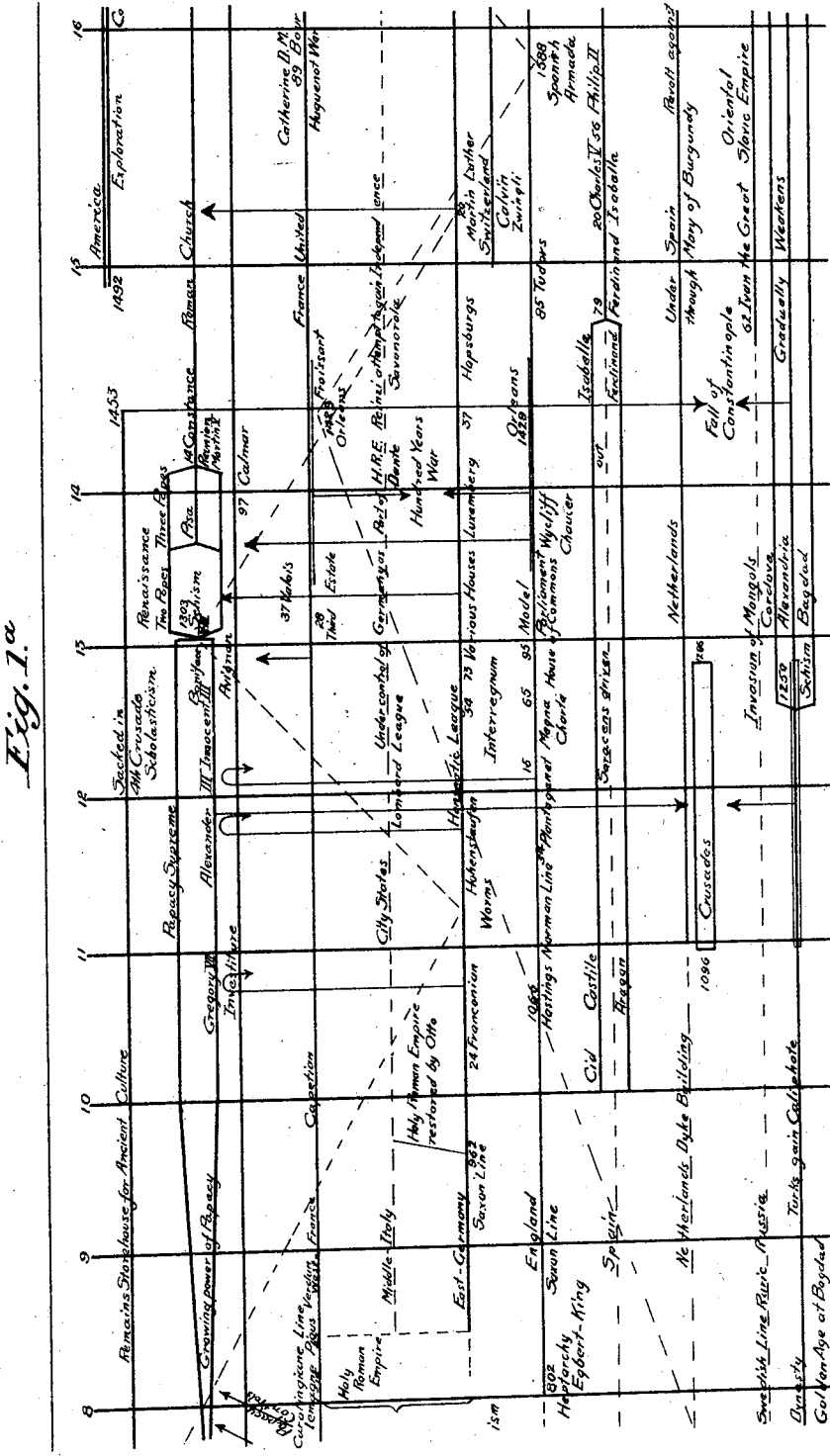

UNITED STATES PATENT OFFICE.

GUY DETRICK, OF ADA, OHIO, ASSIGNOR OF ONE-HALF TO FRANK G. DETRICK, OF ADA, OHIO.

CHART FOR TEACHING UNIVERSAL HISTORY.

1,406,173.  Specification of Letters Patent.  Patented Feb. 14, 1922.

Application filed November 1, 1920. Serial No. 421,043.

*To all whom it may concern:*

Be it known that I, GUY DETRICK, a citizen of the United States, residing at Ada, in the county of Hardin and State of Ohio, have invented new and useful Improvements in Charts for Teaching Universal History, of which the following is a specification.

This invention relates to an educational device intended for use in connection with the study of history.

The object of this invention is to provide a chart which will afford the student a perspective of the world's history at any selected period, whereby he will appreciate the relationship between the political, religious and ethnological development of the various races of the world.

I have observed that a student, in reading history, while able to follow the development of the races individually, finds it extremely difficult to appreciate the fact that many historical events of which he reads are substantially contemporaneous. In other words, it is difficult for the reader of historical text books to appreciate the fact that while certain events of which he is reading were occurring at one part of the world, other events of which he also reads occurred at another part of the world. Moreover, it is difficult to obtain from the average text book on history a clear understanding of the influence which the various races have had upon one another, the time and character of their fusion and, in general, the relationship between their individual, political, ethnological and religious status and development.

It is the object of this invention to eliminate the above mentioned deficiencies in the usual sources of information at the disposal of students of history by supplementing text books with a chart which will convey to the student a perspective of historical events at any given period.

The above and other objects of the invention I accomplish by providing a chart having spaced parallel lines delineating "period" spaces and other lines extending across the period delineating lines to mark the ethnological, political and religious status and development of the various races. The "period" lines will have in association therewith, preferably adjacent thereto, numerals indicating the time in history which they are intended to mark off. The cross or progress lines may also have explanatory notations indicating prominent events in each of the periods delineated by the period lines.

In constructing a chart it is preferable to provide only such explanatory notations as are absolutely necessary to give the student a clear indication of the particular time in history to which the particular point in the chart has reference. In this way there will be provided what may be considered a scaffold which the student may use in conjunction with a text book covering the period set forth on the chart. As the student reads the text book he may make his own notations along the various progress lines, and thus fill out the scaffold as he proceeds with his reading.

In the drawings:—

Fig. 1 is a plan view of a chart such as has been referred to, covering the period from the first to the eighth century, and Fig. 1ª is a continuation of the chart shown in Fig. 1 covering the period to the sixteenth century.

Referring to the chart illustrated in the drawings, so that the invention may be more clearly understood, it will be observed that it is formed by a plurality of spaced parallel lines A marking off the various centuries from the first century to the sixteenth century, the lines having adjacent thereto numerals indicating the periods which they are intended to delineate. Extending across these lines, substantially at right angles, are progress lines having explanatory notations in each of the several periods to indicate some of the principal events of the period. By reference to the left of Fig. 1, it will be noted that a substantially horizontal line B extends through the lines indicating the ends of the first, second and third centuries to mark the development of Rome, while below this line are indicated the various tribes of barbarians which were within the Roman Empire. Still further below the line indicating the progress of the Roman Empire are noted the various tribes of barbarians which were outside the Roman Empire. By following the dotted lines C extending from these tribes, their influence upon later ages will be readily recognized, and thus the student will appreciate the relationship between the various races of today.

The religious progress of the world may be indicated, as by progress lines which parallel the lines indicating the ethnological development above referred to. Thus on the chart illustrated the influence and development of the Papacy is shown by a line D which branches out in the second century from the line indicating the progress of the Roman Empire and continues on paralleling this latter mentioned line. The progress of Mohammedism may be noted by following the lines running from the various tribes outside the Roman Empire.

The great conflicts of history may be indicated by lines E provided with arrow points. Thus, in the first century we see the conflict between the Romans and the barbarians, and a similar conflict noted in the fifth century, the arrow lines running from the various races which participate in the conflicts. In order that sequence of the great conflicts between the powers of the world may be evident at a glance, diagonal lines, which preferably should be dotted, may extend across the chart between these conflicts. Thus, we see the great political conflicts indicated by dotted lines running from Varus in the year 9 A. D. through Chalons 451 A. D. Tours, 732 A. D., Orleans 1429 A. D. and the Spanish Armada, 1599 A. D. The great religious conflicts may be similarly marked off, as will be noted from an inspection of the drawings.

It will be understood that although in the accompanying drawings a chart is illustrated which indicates development through but a comparatively short period, it is possible for one familiar with history to provide such a chart covering the entire history of the world to date. With the aid of such a chart a student may read text books and, by making notations upon the chart as he proceeds, he will obtain such an understanding of history as it is the object of this invention to provide.

Obviously, numerous modifications might be made in the chart illustrated in the accompanying drawings, and other forms of indicating characters might be utilized to set forth the relationships which is the object of the illustrated chart to make clear. All such modifications are considered to come within the scope of this invention, which is not limited to the identical embodiment set forth in the accompanying drawings, but is more clearly and definitely defined in the following claims.

I claim:—

1. An educational chart having spaced substantially parallel lines thereon delineating "period" spaces, lines extending across said period delineating lines to indicate the contemporaneous status and development of the various races of the periods marked off, said last mentioned lines having in the several period spaces in connection therewith just sufficient notations to indicate to the student the particular period, whereby he may recognize the period in reading his text book, there being space upon the chart adjacent each of said lines for additional notations whereby the status and development in each period may be completed in extenso by the student.

2. An educational chart having spaced substantially parallel lines thereon delineating "period" spaces, lines extending across said period delineating lines to indicate the contemporaneous ethnological and political status and development of the various races of the periods marked off, said last mentioned lines having in the several period spaces in connection therewith just sufficient notations to indicate to the student the particular period, whereby he may recognize the period in reading his text book, there being space upon the chart adjacent each of said lines for additional notations whereby the status and development in each period may be completed in extenso by the student.

In testimony whereof I have hereunto set my hand.

GUY DETRICK.